United States Patent [19]

Takahashi

[11] Patent Number: 5,722,075
[45] Date of Patent: Feb. 24, 1998

[54] OVERLAPPING CELL MOBILE COMMUNICATIONS SYSTEM

[75] Inventor: Nobuya Takahashi, Tokyo, Japan

[73] Assignee: NEC Corporation, Tokyo, Japan

[21] Appl. No.: 432,771

[22] Filed: May 2, 1995

[30] Foreign Application Priority Data

May 23, 1994 [JP] Japan .................................. 6-108153

[51] Int. Cl.$^6$ .................................................. H04Q 7/20
[52] U.S. Cl. .................................................. 455/449; 455/422
[58] Field of Search ........................... 455/33.1, 33.4, 455/63, 56.1, 62, 66; 379/59

[56] References Cited

U.S. PATENT DOCUMENTS

| | | | |
|---|---|---|---|
| 5,251,249 | 10/1993 | Allen et al. | 455/33.1 |
| 5,329,576 | 7/1994 | Handforth | 455/33.1 |
| 5,353,332 | 10/1994 | Raith et al. | 455/56.1 |
| 5,402,523 | 3/1995 | Berg | 455/33.4 |

*Primary Examiner*—Reinhard J. Eisenzopf
*Assistant Examiner*—Sam Bhattacharya
*Attorney, Agent, or Firm*—Sughrue, Mion, Zinn, Macpeak & Seas, PLLC

[57] ABSTRACT

Co-channel interference due to the use of smaller and lighter mobile communication terminals at elevated locations in the recent widespread mobile communications services can be prevented from increasing by applying an overlapping cell configuration composed of a plurality of groups of cells, for example, a group of cells covering a ground surface and another group of larger cells covering an elevated space above the ground surface, and assigning different groups of radio frequency channels to the groups of cells.

3 Claims, 2 Drawing Sheets

OVERLAPPING CELL MOBILE COMMUNICATIONS SYSTEM

BACKGROUND OF THE INVENTION

1. Field of the Invention

The present invention relates to a cellular mobile communications system, and more particularly to a cellular mobile communications system having an overlapping cell configuration.

2. Description of the Prior Art

In a conventional cellular mobile communications system such as an automobile telephone system, and a portable telephone system, the whole service area is generally covered by a group of cells of uniform radius which are defined on the ground surface as shown in FIG. 2 of the accompanying drawings. Each cell has a base station positioned at its center, and in assigning radio frequency channels to the cells, the same radio frequency channels are assigned in non-contiguous cells that are spaced by a certain distance in order to avoid co-channel interference, so that the available channels can effectively be reused. In FIG. 2, the same radio frequency channels are assigned to cells 21, 22, 23, 24.

It has been proposed to use plural cell sizes, i.e., to divide a group of cells in a certain geographical area into a group of cells of smaller radius than in the original cells (U.S. patent application Ser. No. 07/725,429—Sep. 22, 1976).

With the recent progress of smaller and lighter terminals for mobile communications and widespread portable telephone services, a large number of users have begun to use portable telephone terminals at elevated positions above the ground surface, e.g., on middle to higher floors and rooftops of high buildings and skyscrapers. The propagation loss of radio waves is much smaller in an elevated space at a certain height above the ground surface than on the ground surface because obstacles are fewer in the elevated space than on the ground surface. Therefore, even though certain radio frequency channels may be used in certain different cells on the ground surface, use of the same radio frequency channels in the elevated space causes channel interference in these different cells.

SUMMARY OF THE INVENTION

It is an object of the present invention to provide a cellular mobile communications system having an overlapping cell configuration which is capable of preventing increase of co-channel interference due to widespread use of an increased number of smaller and lighter terminals for mobile communications in various locations on and above the ground surface.

A particular object of the present invention is to prevent increase of co-channel interferences owing to the increasing use of mobile terminals at elevated locations of high buildings or skyscrapers.

To achieve the above objects, there is provided a cellular mobile communications system to which an overlapping cell configuration is applied, comprising a plurality of groups of cells covering a service area in an overlapping relation, and a different group of radio frequency channels being assigned to each of the groups of cells. The groups of cells may include a group of cells covering the ground surface and another group of cells covering an elevated space at a certain height above the ground surface.

DETAILED DESCRIPTION OF THE PREFERRED EMBODIMENT

Explanation will be given regarding an embodiment of the present invention with reference to the two figures.

Figure 1:
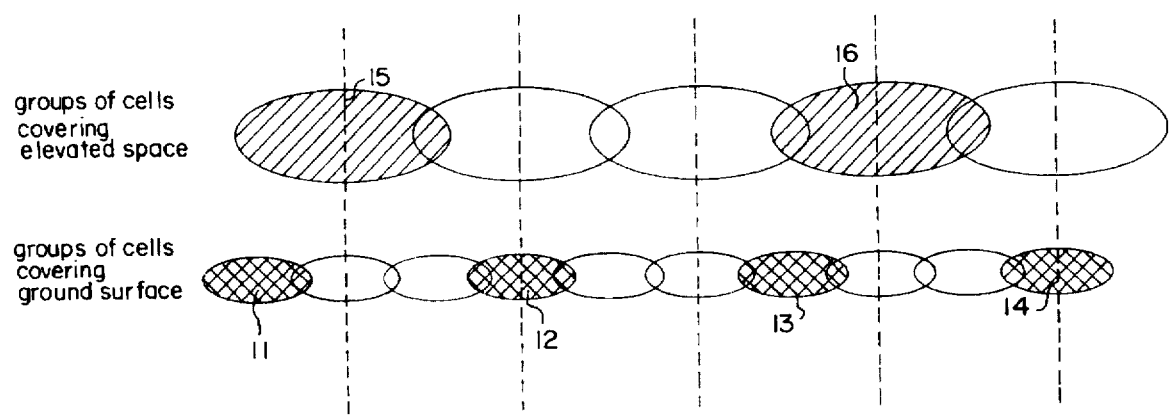
FIG. 1 is a schematic sectional oblique perspective showing an arrangement of a group of cells covering the ground surface and a group of cells covering an elevated space above the ground surface in a overlapping cell mobile communications system according to the present invention.
Figure 2:
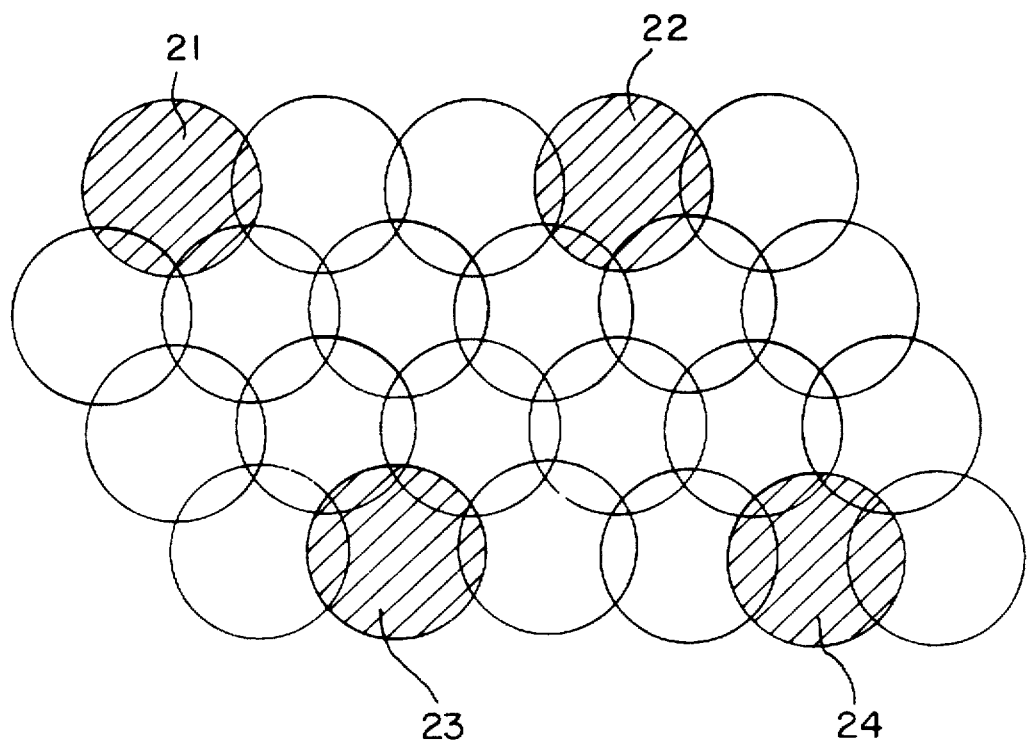
FIG. 2 is a plan view showing an arrangement of a group of cells in a conventional cellular mobile communication system.

FIG. 1 shows an example of an overlapping cell configuration applicable to a cellular mobile communications system according to the present invention, in which there is a group of cells covering a ground surface, i.e., a lower layer of cells, and another group of cells covering an elevated space above the ground surface, i.e., an upper layer of cells, and the radius of the upper layered cell is greater than that of the lower layered cell. The lower layered cells are the same as those shown in FIG. 2.

Since obstacles to radio wave propagation in the elevated space above the ground surface are much fewer than those on the ground surface, the propagation loss of radio waves in the elevated space is much smaller than the propagation loss of radio waves on the ground surface. Consequently, the radius of the upper layered cell is considerably greater than the radius of the lower layered cell.

To the groups of cells in the upper and lower layers are assigned different groups of radio frequency channels that are determined in optimum patterns of frequency channel allocations depending on the respective propagation characteristics in each layered cells.

In FIG. 1, the cells of the group on the ground surface include cells 11, 12, 13, 14 in which the same radio frequency channels are reused, and the cells of the group in the elevated space above the ground surface include cells 15, 16 in which the same radio frequency channels are reused.

In FIG. 1, the radius of the cells of the group in the elevated space is twice the radius of the cells of the group on the ground surface. The centers of the cells of the group in the elevated space are positioned at the centers of every other cell of the group on the ground surface.

Although a certain preferred embodiment of the present invention has been shown and described in detail, it should be understood that various changes and modifications may be made therein without departing from the scope of the appended claims.

What is claimed is:

1. A cellular mobile communications system, comprising:

a plurality of groups of cells arranged to cover a service area in a vertically overlapping configuration, wherein different groups of radio frequency channels are respectively assigned to said plurality of groups of cells, wherein said plurality of groups of cells includes at least one group of cells coveting a ground surface and at least one group of cells covering an elevated space at a predetermined height above said ground surface; and wherein the radius of each cell of said at least one group of cells covering said elevated space is greater than the radius of each cell of said at least one group of cells covering said ground surface.

2. The cellular mobile communications system according to claim 1, wherein the centers of said cells of said at least one group of cells covering said elevated space are positioned at the centers of a portion of said cells of said at least one group of cells covering said ground surface.

3. The cellular mobile communications system according to claim 1, wherein said plurality of groups of cells includes at least two groups of cells covering said elevated space.

* * * * *

UNITED STATES PATENT AND TRADEMARK OFFICE
CERTIFICATE OF CORRECTION

PATENT NO. : 5,722,075
DATED : February 24, 1998
INVENTOR(S) : Nobuya TAKAHASHI

It is certified that error(s) appears in the above-identified patent and that said Letters Patent is hereby corrected as shown below:

Col. 2, line 61 delete "coveting" and insert -- covering --

Signed and Sealed this

Twenty-ninth Day of December, 1998

Attest:

BRUCE LEHMAN

*Attesting Officer*          *Commissioner of Patents and Trademarks*